United States Patent Office 3,120,490
Patented Feb. 4, 1964

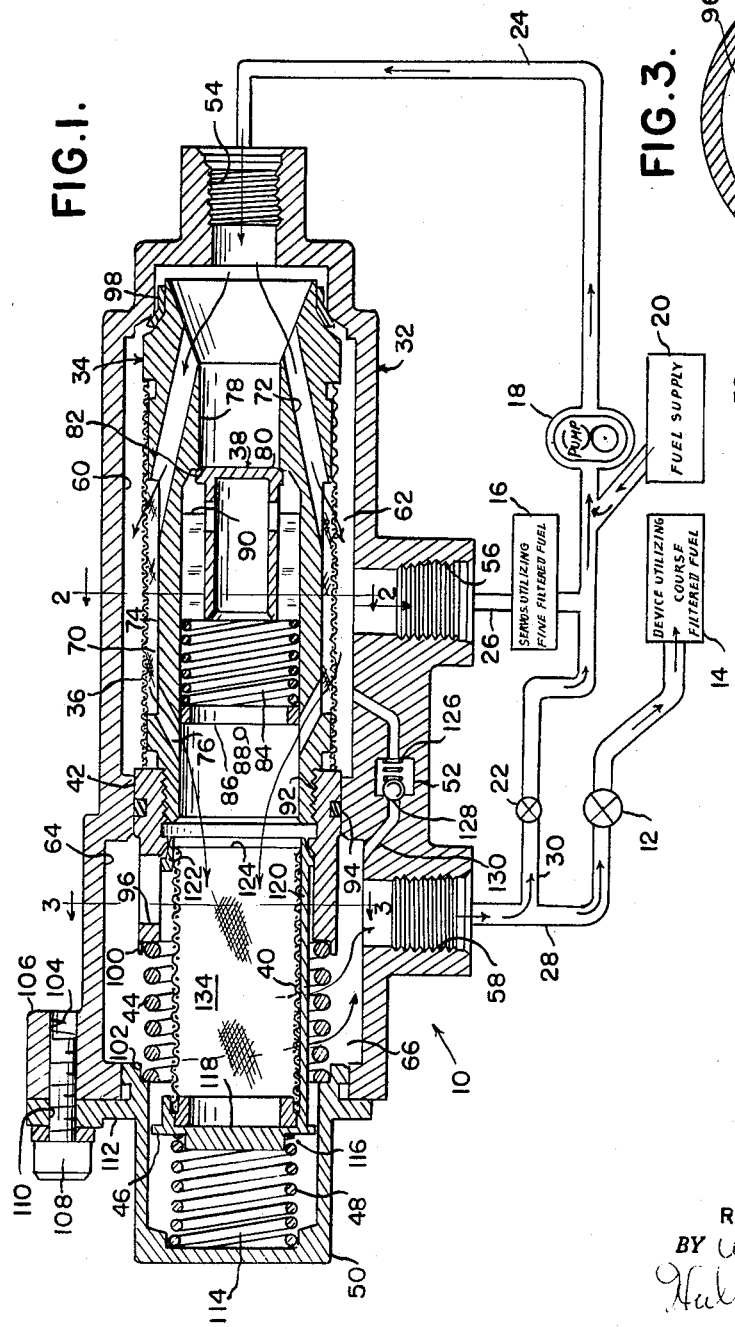
Feb. 4, 1964    R. G. SAMSON    3,120,490
HIGH VELOCITY FILTER
Filed Sept. 6, 1960    2 Sheets-Sheet 1
INVENTOR.
ROGELIO G. SAMSON
ATTORNEYS Feb. 4, 1964
R. G. SAMSON
3,120,490
HIGH VELOCITY FILTER
Filed Sept. 6, 1960
2 Sheets-Sheet 2
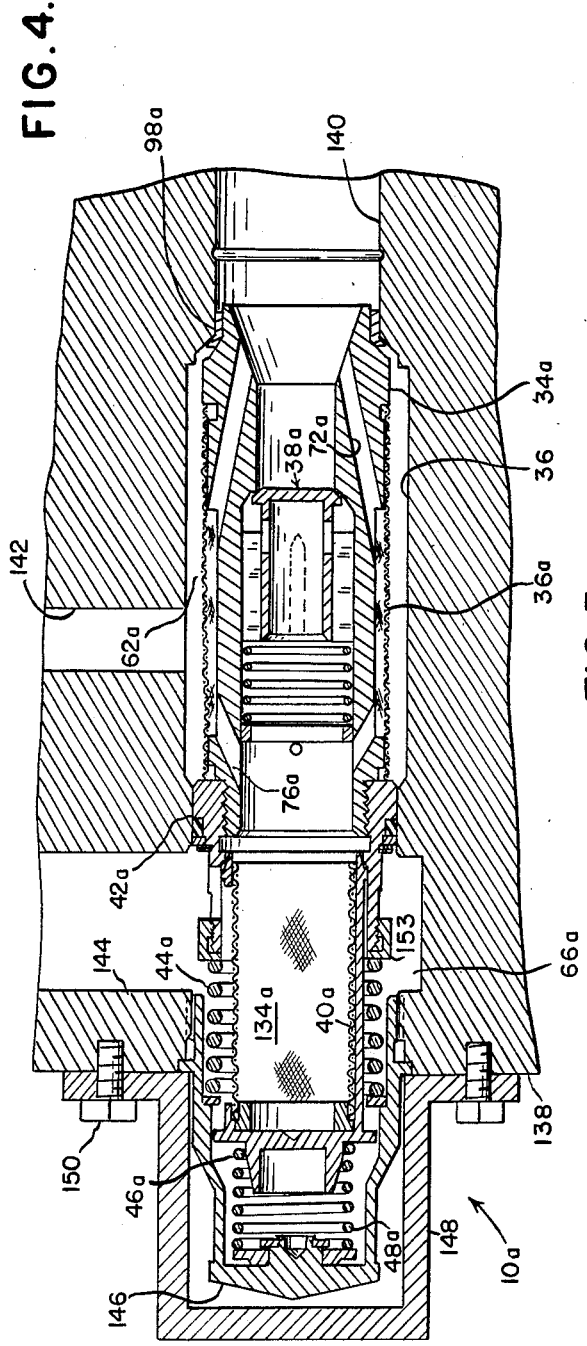
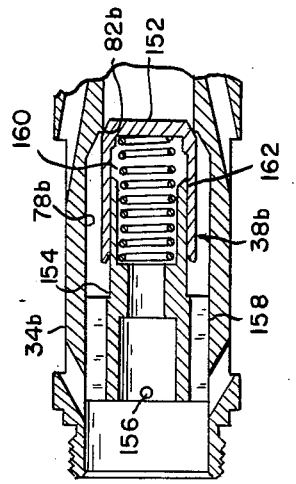
*INVENTOR.*
ROGELIO G. SAMSON
BY
ATTORNEYS

3,120,490
HIGH VELOCITY FILTER
Rogelio G. Samson, Detroit, Mich., assignor to Holley Carburetor Company, Van Dyke, Mich., a corporation of Michigan
Filed Sept. 6, 1960, Ser. No. 54,248
11 Claims. (Cl. 210—132)

The invention relates generally to fuel filters and refers more specifically to a high velocity self-washing fuel filter capable of supplying both fine and coarse filtered fuel and including filter bypass means.

In the past separate fuel filters have often been used to provide fuel filtered in different degrees. Thus, many parts of the filters and connecting means thereto are often duplicated at substantial expense. In addition prior fuel filters have generally not been of the self-washing type. Such filters require frequent changing or cleaning with consequent high maintenance cost.

Also, in the past fuel filters have generally provided no means for bypassing fuel around the filter should the filter become clogged. Thus with prior filters should the filter become clogged the feeding of fuel to the utilizing device is stopped. It will be understandable that in some applications, such as with aircraft instruments and engines, it would be more desirable to provide unfiltered fuel therefor than to stop feeding fuel thereto because a filter in the fuel line became clogged.

It is therefore an object of the present invention to provide a high speed fuel filter for supplying both coarse and fine filtered fuel which filter is self-cleaning.

Another object is to provide a high speed fuel filter including means for finely filtering a portion of the fuel passing therethrough and separate means for coarsely filtering the remaining fuel passing therethrough.

Another object is to provide a high speed fuel filter as set forth above including means for bypassing the fuel around the fine filter means should the fine filter means become clogged.

Another object is to provide a high speed fuel filter as set forth above including means for bypassing the fuel around the coarse filter means should the coarse filter means become clogged.

Another object is to provide a high speed fuel filter having an outer body member including a fuel inlet opening and a pair of fuel outlet openings and an inner body member including coarse and fine filter screens associated therewith adapted to separately filter fuel passed through the fuel inlet opening and guide the separate filtered fuel through the separate fuel outlet openings.

Another object is to provide a fuel filter comprising a cylindrical outer body member having a fuel inlet opening at one end thereof and including a pair of interior annular recesses spaced longitudinally thereof, an inner hollow body member positioned within the outer body member to form chambers in conjunction with the recesses, said inner body member having an annular exterior recess and passages from the interior surface to and from said annular recess, a fine filter screen secured around the exterior of the inner body member over said exterior recess and means for causing the fuel entering the fuel inlet opening in the outer housing member to pass through the passages into the exterior annular recess whereby part of the fuel passes through the fine filter screen into one of said annular interior recesses and out of an outlet opening in the outer body member, the rest of the fuel passing back into the interior of the inner body member, said filter further including a spacing member operable between the inner and outer body members and a coarse filter screen positioned to receive said rest of said fuel operable to filter said rest of said fuel as it passes into the other annular inner recess in the outer body member and out through a second outlet opening in the outer body member.

Another object is to provide a high speed fuel filter as set forth above wherein said means for causing the fuel entering the fuel inlet opening to pass through said passages includes a check valve within the inner body member operable to permit axial flow of fuel directly through the inner body member should the pressure drop in the fuel passing through the inner body member by way of the exterior recess become too large when large volumes of fuel pass through the filter and to prevent axial flow of fuel through the inner body member when the volume of fuel passing through the filter is low to maintain a minimum velocity of fuel past the fine filter screen to effectively wash the screen.

Another object is to provide a high speed fuel filter as set forth above wherein the coarse filter screen is spring loaded to permit passage of fuel directly from the inner body member to the fuel outlet opening should the coarse filter screen become clogged.

Another object is to provide a high speed fuel filter structure as set forth above wherein the outer housing therefor is an integral part of a larger housing such as a fuel utilization device.

Another object is to provide a high speed fuel filter as set forth above which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a longitudinal section of a high speed fuel filter constructed in accordance with the invention and showing diagrammatically a system in which the fuel filter may be used.

FIGURE 2 is a cross section of the high speed fuel filter shown in FIGURE 1 taken on the line 2—2 of FIGURE 1.

FIGURE 3 is a cross section of the high speed fuel filter shown in FIGURE 1 taken on the line 3—3 in FIGURE 1.

FIGURE 4 is a longitudinal cross section of a high speed fuel filter similar to that illustrated in FIGURE 1 adapted to be included in a system wherein the outer housing of the filter is supplied by the system housing.

FIGURE 5 is a longitudinal cross section of a modified check valve that may be employed in the high speed filter shown in FIG. 1.

With reference to the drawings a particular embodiment of the present invention will now be disclosed.

As shown in FIGURE 1 the high speed fuel filter 10 is included in a fuel system for supplying coarse filtered fuel through a main control valve 12 to a device 14, such as an aircraft engine using coarse filtered fuel, and for supplying fine filtered fuel to aircraft instruments, such as servo-mechanisms 16. The fuel system in which the fuel filter 10 is shown in FIGURE 1 further includes pump 18, fuel supply 20 and a bypass regulator valve 22.

In operation fuel is pumped from fuel supply 20 by means of pump 18 through conduit 24 to the filter 10. In the filter 10 a portion of the fuel is first filtered to provide a very fine filtered fuel which is fed to the servo-mechanisms 16 through conduit 26. The remaining fuel pumped to filter 10 is relatively coarsely filtered and passed to a utilization device, such as an aircraft engine through conduit 28 and main control valve 12 or is bypassed back to the fuel supply by means of conduit 30 and bypass valve 22.

The high speed filter 10 more specifically comprises an outer body member 32, an inner body member 34, fine filter screen 36 and check valve assembly 38, as shown in FIGURE 1. A coarse filter screen 40, spacer 42, spring 44, coarse filter screen retainer 46, spring 48, end cover 50 and transfer valve assembly 52 are also included in the high speed filter 10.

The outer body member 32 is shaped as shown in FIGURES 1–3 and includes the fuel inlet opening 54 adapted to be connected to conduit 24 and fuel outlet passages 56 and 58 adapted to be connected to conduits 26 and 28 respectively. The outer body member 32 also includes the inner annular recess 60 which with fine filter screen 36 forms an annular chamber 62 for fine filtered fuel before it passes through the outlet passage 56 in the outer body member 32. Spaced axially from the recess 60 is a second annular interior recess 64 within the outer body member 32 which provides a chamber 66 in conjunction with the coarse filter screen 40 to receive fuel passing through the screen 40 before it is discharged through the outlet passage 58.

The inner body member 34 of the fuel filter 10 is shaped as shown in FIGURES 1–4 and includes the annular exterior recess 70 into which fuel from inlet conduit 24 passes through the plurality of passages 72 extending longitudinally of the inner body member 34 at an angle of less than ten degrees with the axis of the inner body member. Fuel which does not pass through the fine filter screen 36 into chamber 62 is passed out of the chamber 74 formed between the fine fuel filter and the inner body member through the series of passages 76 in the inner body member.

The inner body member 34 further includes a passage 78 therethrough in which the check valve assembly 38 is positioned. The check valve assembly 38 comprises a valve member 80 urged by means of spring 84 into seating relation with valve seat 82 formed within the passage 78. Spring 84 is held in position within the passage 78 by means of retaining ring 86 and pin 88 as shown. The valve 80 includes spacing fins 90 angularly positioned around the outer periphery thereof to guide the valve's movement longitudinally of the passage 78 but not to restrict fuel flow therearound.

A spacer 42 which may be threadedly engaged with the inner body member 34, as shown at 92, and which is provided with sealing means 94 to seal between the recesses 60 and 64 of the outer body member is provided to retain the fine filter screen 36 in assembled position on the inner body member 34. The spacer 42 is provided with openings 96 spaced angularly therearound to provide more area for flow of fuel into the chamber 66.

The inner body member and spacer are positioned axially within the outer body member 32 and sealing pressure is provided against seal 98 by means of spring 44 which engages the spacer 42 at end 100 and the end cover 50 at end 102. End cover 50 is secured to the outer body member 32 by means of threaded openings 104 in bosses 106 on the outer body member 32 in conjunction with bolts 108 passing through openings 110 in flange 112. End cover 50 also provides support for end 114 of spring 48, the other end 116 of which is abutted against the retainer 118 for the coarse filter screen 40. Retainer 118 for coarse filter screen 40 includes a plurality of angularly spaced ribs 120 extending longitudinally of the cylindrical coarse filter screen 40 to support the sealing ring 122 at end 124 of the coarse filter screen 40.

The transfer valve assembly, as shown best in FIGURE 1, comprises a compression spring 126 and a ball valve 128 which is urged into position to close conduit 130 leading from chamber 66 to chamber 62 when the pressure differential between the chambers 66 and 62 is insufficient to unseat the ball 128 in opposition to the spring 126.

In operation fuel is pumped from fuel supply 20 by pump 18 through conduit 24 and into inlet opening 54 in the outer body member 32. Since the check valve 38 is initially closed the fuel will proceed outwardly through passages 72 into chamber 70. Part of the fuel entering chamber 70 will be filtered through the fine filter screen 36 and enter chamber 62. The rest of the fuel entering the inlet opening 54 will pass through the plurality of passages 76 to the coarse filter 40.

Due to the particular small angle at which the passages 72 are oriented with respect to the screen 36 and the high flow velocity, the contaminant particles in the fuel travel along the screen 36 without passing through it. Because the direction of flow is parallel to the screen 36, the fuel also tends to wash the screen 36 free of any contaminant particles. As previously indicated the angle between the passages 72 and the screen 36 should be less than ten degrees. Also, for best filtering and washing results the screen should have square openings therein. Through tests it has been found that with a fine filter structure as described that when fuel passing the fine filter is twenty-five percent of the total fuel pumped, the filter is about ninety-five percent effective. For lower fine filter rates the fine filter construction has been found to be almost one hundred percent efficient. Thus with the present construction high filtration efficiency is provided along with a filter which is washed by the fuel pump pressure by which the fuel is fed to the filter.

The fuel passing out through the passages 76 enters the interior of cylindrical coarse filter section 40 and passes radially outwardly therethrough into chamber 66. As previously indicated the coarse filtered fuel from chamber 66 then passes through outlet passage 58 to be fed to a utilizing device or back to the pump 18. Similarly, as previously indicated, the fine filtered fuel in chamber 62 passes out of the filter through the outlet passage 56 to the utilizing servos and subsequently back to the pump 18.

Since little or no fuel will be passing through the filter screen 36 when it is clogged the pressure in chamber 62 will be greatly reduced in comparison to the pressure in chamber 66. Therefore the ball valve 128 of the transfer valve assembly 52 will be unseated in opposition to the spring 126 whereby coarse filtered fuel from chamber 66 will be passed through passage 130 into the chamber 62. Thus when the fine filter screen is clogged instead of the fuel supply to the servos being interrupted the fuel therefor will be supplied from the coarse filtered fuel by means of the transfer valve assembly 52.

Further should the coarse filter screen 40 become clogged the pressure in the chamber 134 will become large enough to move the retainer 118 and the coarse filter screen 40 to the left, as shown in FIGURE 1, against the bias of spring 114 whereby the sealing ring 122 is disengaged from the spacer 42 and unfiltered fuel is allowed to pass directly through opening 96 into chamber 66. Thus should the coarse filter screen become clogged unfiltered fuel is supplied to the utilizing device through outlet passage 58 and to the servos should the fine filter screen also be clogged, as indicated above.

In FIGURE 4 a modification 10a of the high speed fuel filter 10 illustrated in FIGURES 1–3 is shown. The construction of the fuel filter 10a is similar to that of the fuel filter 10 and like numbers followed by the suffix a are used to designate similar members.

In the modified fuel filter 10a no separate outer body member is provided. Instead the inner body member 34a, fine filter screen 36a, check valve assembly 38a, coarse filter screen 40a, spacer 42a, spring 44a, retainer 46a and spring 48a are positioned in a cylindrical passage 136 shaped as shown in a larger housing member 138. The housing 138 includes fuel inlet passage 140 and fuel outlet passage 142 for fine filtered fuel and fuel outlet passage 144 for coarse filtered fuel. The filter 10a may be secured to the housing 138 by means of filter cap 146 shaped as shown in FIGURE 4 and cover 148 secured to the housing 138 by convenient means, such as bolts 150. Alternatively, cap 146 may be threaded into the housing 138 and cover 148 eliminated.

It will be noted in filter 10a that a nut 153 is secured to the spacer 42a to provide a removable seat for spring 44a which facilitates assembly of the filter. Also, the end structure of the retainer 46a has been modified to improve check valve action of the coarse filter screen 40a and the relief valve assembly 52 of the filter 10 has not been shown in conjunction with the filter 10a. It will be understood of course that the relief valve assembly shown in conjunction with the filter 10 may also be included in the filter 10a. The operation of the filter 10a is entirely analogous to that previously described for the filter 10.

In FIGURE 5 a modification of the check valve assembly 38b is illustrated. The modified check valve assembly 38b includes the cup shaped valve member 152, support and guiding structure 154 therefor held in position in passage 78b in the inner body member 34b by means of pin 156. Angularly spaced vanes 158 are provided on member 154 to allow axial passage of fuel through the passage 78b on opening of the valve member 152. The spring 160 is seated in the cylindrical end 162 of support and guiding member 154 and urges the valve member 152 against valve seat 82b of inner body member 34b. The operation of the check valve assembly 38b is entirely analogous to the operation of the check valve assembly 38 indicated in FIGURE 1.

Thus in accordance with the invention there is provided a fuel filter through which fuel may pass at high speeds which is capable of providing both coarse and fine filtered fuels. In addition, in accordance with the invention the fine filter screen is washed by the fuel pressure of the pumped fuel to reduced clogging thereof and bypass means are provided to supply unfiltered or coarse filtered fuel to the device, utilizing the fuel from the filter should the coarse filter screen or the fine filter screen respectively become clogged. In addition the fuel filter disclosed is capable of use in a system wherein the filter is entirely separate from the other elements thereof or in a system wherein the filter is included as an integral part of a larger housing.

The drawings and the foregoing specification constitute a description of the improved high velocity filter in such full, clear, concise and exact terms as to enable any person skilled in the art to practice the invention, the scope of which is indicated by the appended claims.

What I claim as my invention is:

1. A high velocity fuel filter comprising a hollow, generally cylindrical, outer body member having a pair of axially spaced apart interior annular recesses therein, inlet means at one end of the outer body member for guiding fuel to be filtered thereinto, separate fuel outlet means in communication with each of the interior recesses through which filtered fuel is discharged from the outer body member, a tubular inner body member substantially coaxial with said outer body member secured within said one end of the outer body member to form a sealed annular chamber in conjunction with one of said interior recesses and having an annular exterior recess therearound axially aligned with said one interior recess, a cylindrical filter screen sleeved over said inner body member for separating said exterior recess from said one interior recess, means for guiding fuel received in said one end of the outer body member into one end of the inner body member and through the inner body member into the exterior recess so that a portion of the fuel is filtered through said filter screen into the first interior recess and out of the outer body member, means for guiding the remainder of the fuel guided into the exterior recess back through the inner body member into the other end of the inner body member, and a second filter screen substantially coaxial with and in axially spaced relation to the inner body member separating the other end of the inner body member and the other interior annular recess in the outer body member for filtering fuel guided into said other end of the inner body member before it passes into the other interior recess and out of the outer body member and means operable between the inner body member and second filter screen for guiding fuel from said other end of the inner body member through the second filter screen.

2. Structure as claimed in claim 1 wherein the means for guiding fuel received in said one end of the outer body member into one end of the inner body member and through the inner body member into the exterior recess includes a plurality of angularly spaced passages extending through the inner body member between the inner surface thereof and the exterior recess formed therein which passages are inclined to the longitudinal axis of the tubular body member so that fuel passing through the passage is caused to strike the filter sleeved over the inner body member at an angle to cause washing of the filter sleeved over the inner body member.

3. Structure as claimed in claim 2 wherein the passages are inclined with respect to the longitudinal axis of the tubular member at an angle of not greater than ten degrees.

4. A high velocity fuel filter comprising a hollow, generally cylindrical, outer body member having a pair of axially spaced apart interior annular recesses therein, inlet means at one end of the outer body member for guiding fuel to be filtered thereinto, separate fuel outlet means in communication with each of the interior recesses through which filtered fuel is discharged from the outer body member, a tubular inner body member substantially coaxial with said outer body member secured within said one end of the outer body member to form a sealed annular chamber in conjunction with one of said interior recesses and having an annular exterior recess therearound axially aligned with said one interior recess, a cylindrical filter screen sleeved over said inner body member for separating said exterior recess from said one interior recess, means for guiding fuel received in said one end of the outer body member into one end of the inner body member and through the inner body member into the exterior recess so that a portion of the fuel is filtered through said filter screen into the first interior recess and out of the outer body member, means for guiding the remainder of the fuel guided into the exterior recess back through the inner body member into the other end of the inner body member, a second filter screen substantially coaxial with and in axially spaced relation to the inner body member separating the other end of the inner body member and the other interior annular recess in the outer body member for filtering fuel guided into said other end of the inner body member before it passes into the other interior recess and out of the outer body member, means operable between the inner body member and second filter screen for guiding fuel from said other end of the inner body member through the second filter screen, and a check valve secured within the inner body member operable to permit direct passage of fuel from one end to the other of the inner body member when the difference in fuel pressures at the opposite ends of the inner body member is greater than a predetermined value.

5. Structure as claimed in claim 4 wherein said check valve comprises an annular valve seat formed in the interior surface of said tubular inner body member, a valve member having a head adapted to seat on said valve seat to prevent flow of fluid directly through said inner body member without passing through said exterior recess, said valve member having a cylindrical shank with radially extending fins thereon to guide the axial movement of said valve member in said inner body member without preventing flow of fuel therearound when the head thereof is not seated on said valve seat, and resilient means urging said valve member toward said one end of said cylindrical opening into seated position.

6. Structure as claimed in claim 4 wherein said check valve comprises an annular valve seat formed in the interior surface of said tubular inner body member, a valve member having a cup shaped head adapted to seat on said valve seat to prevent flow of fluid directly through said exterior recess, a stationary cylindrical member secured within said tubular inner body member on which said valve member is sleeved for axial movement, said cylindrical member having radial vanes spaced angularly thereabout to permit axial passage of fuel through said inner body member when said valve member is not seated, and resilient means acting between said cylindrical member and valve member urging said valve member toward said one end of said cylindrical opening into seated position.

7. A high velocity fuel filter comprising a hollow, generally cylindrical, outer body member having a pair of axially spaced apart interior annular recesses therein, inlet means at one end of the outer body member for guiding fuel to be filtered thereinto, separate fuel outlet means in communication with each of the interior recesses through which filtered fuel is discharged from the outer body member, a tubular inner body member substantially coaxial with said outer body member secured within said one end of the outer body member to form a sealed annular chamber in conjunction with one of said interior recesses and having an annular exterior recess therearound axially aligned with said one interior recess, a cylindrical filter screen sleeved over said inner body member for separating said exterior recess from said one interior recess, means for guiding fuel received in said one end of the outer body member into one end of the inner body member and through the inner body member into the exterior recess so that a portion of the fuel is filtered through said filter screen into the first interior recess and out of the outer body member, means for guiding the remainder of the fuel guided into the exterior recess back through the inner body member into the other end of the inner body member, a second filter screen substantially coaxial with and in axially spaced relation to the inner body member separating the other end of the inner body member and the other interior annular recess in the outer body member for filtering fuel guided into said other end of the inner body member before it passes into the other interior recess and out of the outer body member, and means for providing a fuel flow around said second filter screen during operation of the filter when the second filter screen becomes clogged.

8. A high velocity fuel filter comprising a hollow, generally cylindrical, outer body member having a pair of axially spaced apart interior annular recesses therein, inlet means at one end of the outer body member for guiding fuel to be filtered thereinto, separate fuel outlet means in communication with each of the interior recesses through which filtered fuel is discharged from the outer body member, a tubular inner body member substantially coaxial with said outer body member secured within said one end of the outer body member to form a sealed annular chamber in conjunction with one of said interior recesses and having an annular exterior recess therearound axially aligned with said one interior recess, a fine cylindrical filter screen sleeved over said inner body member for separating said exterior recess from said one interior recess, means for guiding fuel received in said one end of the outer body member into one end of the inner body member and through the inner body member into the exterior recess so that a portion of the fuel is filtered through said filter into the first interior recess and out of the outer body member, means for guiding the remainder of the fuel guided into the exterior recess back through the inner body member into the other end of the inner body member, a coarse cylindrical filter screen substantially coaxial with and in axially spaced relation to the inner body member separating the other end of the inner body member and the other interior annular recess in the outer body member for filtering fuel guided into said other end of the inner body member before it passes into the other interior recess and out of the outer body member, and check valve means connected between said interior recesses operable to permit flow of filtered fuel from the other interior recess into the one interior recess when the fine filter screen becomes clogged.

9. A fuel filter comprising a tubular outer body member having an annular interior recess adjacent one end thereof, inlet means at the one end of the body member for guiding fuel to be filtered thereinto, separate fuel outlet means in communication with the annular interior recess and with the other end of the outer body member through which filtered fuel is discharged from the outer body member, a tubular inner body member secured within the one end of the outer body member having an annular exterior recess therearound axially aligned with said interior recess in the outer body member to form a sealed annular chamber in conjunction therewith, a tubular filter screen sleeved over said inner body member for separating said exterior recess from said interior recess, means for guiding fuel received in said one end of the outer body member into one end of the inner body member and through the inner body member into the exterior recess so that a portion of the fuel is filtered through said filter screen into the interior recess and out of the outer body member through one of the fuel outlet means, means for guiding the remainder of the fuel guided into the exterior recess back through the inner body member into the other end of the inner body member, a second filter screen secured within the other end of the outer body member between the other end of the inner body member and the other fuel outlet means at the other end of the outer body member for filtering fuel guided into said other end of the inner body member, and means operable between the inner body member and second filter screen for guiding fuel from said other end of the inner body member through said second filter screen and out of said fuel filter through the other fuel outlet means.

10. Structure as set forth in claim 9 and further including means secured within the inner body member for permitting direct passage of fuel from one end to the other of the inner body member when the difference in fuel pressures at the opposite ends of the inner body member is greater than a predetermined value.

11. Structure as set forth in claim 9 and further including means connected between said fuel outlets operable to permit flow of filtered fuel from said other outlet to said one outlet after a predetermined pressure differential is established therebetween.

References Cited in the file of this patent

UNITED STATES PATENTS

| | | |
|---|---|---|
| 824,973 | Braznell | July 3, 1906 |
| 2,422,647 | Vokes | June 17, 1947 |
| 2,425,848 | Vawter | Aug. 19, 1947 |
| 2,661,845 | Sullivan | Dec. 8, 1953 |
| 2,670,759 | St. Clair | Mar. 2, 1954 |
| 2,725,076 | Hansen et al. | Nov. 29, 1955 |
| 2,793,752 | Jay | May 28, 1957 |
| 2,809,660 | Becker | Oct. 15, 1957 |
| 2,868,382 | Best | Jan. 13, 1959 |
| 2,979,160 | Haas | Apr. 11, 1961 |
| 3,000,505 | Scavuzzo | Sept. 19, 1961 |
| 3,021,954 | Allen | Feb. 20, 1962 |

FOREIGN PATENTS

| | | |
|---|---|---|
| 751,892 | Great Britain | July 4, 1956 |